US008833553B2

(12) United States Patent
Corey et al.

(10) Patent No.: US 8,833,553 B2
(45) Date of Patent: Sep. 16, 2014

(54) DURABLE PACKAGING ASSEMBLY FOR MEDIA DEVICES

(71) Applicant: Travel Tags, Inc., North Mankato, MN (US)

(72) Inventors: David E. Corey, Redlands, CA (US); Shelle B. Pascua, Sherwood, OR (US)

(73) Assignee: Travel Tags, Inc., North Mankato, MN (US)

( * ) Notice: Subject to any disclaimer, the term of this patent is extended or adjusted under 35 U.S.C. 154(b) by 84 days.

(21) Appl. No.: 13/656,486

(22) Filed: Oct. 19, 2012

(65) Prior Publication Data

US 2013/0068642 A1    Mar. 21, 2013

Related U.S. Application Data

(63) Continuation of application No. 12/962,372, filed on Dec. 7, 2010, now Pat. No. 8,292,072.

(60) Provisional application No. 61/267,340, filed on Dec. 7, 2009, provisional application No. 61/306,859, filed on Feb. 22, 2010.

(51) Int. Cl.
| B65D 85/57 | (2006.01) |
| G11B 33/04 | (2006.01) |
| B42D 15/08 | (2006.01) |
| B42D 15/02 | (2006.01) |
| B42D 25/00 | (2014.01) |

(52) U.S. Cl.
CPC .......... *G11B 33/0422* (2013.01); *B42D 15/085* (2013.01); *B42D 15/025* (2013.01); *B42D 15/10* (2013.01); *B42D 2037/10* (2013.01); *Y10S 206/807* (2013.01)

USPC .......... 206/311; 206/459.1; 206/807

(58) Field of Classification Search
USPC ........... 206/308.1, 308.2, 311, 312, 313, 206/387.11, 459.1, 459.5, 807; 283/100, 283/103, 105, 106
See application file for complete search history.

(56) References Cited

U.S. PATENT DOCUMENTS

| 3,288,281 A | 11/1966 | Sparks |
| 3,773,251 A | 11/1973 | Hadick |
| 5,275,285 A | 1/1994 | Clegg |
| 5,419,433 A | 5/1995 | Harrer et al. |
| 5,489,123 A | 2/1996 | Roshkoff |
| 5,493,801 A * | 2/1996 | James .................. 40/642.01 |
| 5,544,741 A | 8/1996 | Fantone et al. |
| 5,588,526 A | 12/1996 | Fantone et al. |
| 5,609,253 A | 3/1997 | Goade, Sr. |
| 5,650,209 A | 7/1997 | Ramsburg et al. |
| 5,760,381 A | 6/1998 | Stich et al. |

(Continued)

OTHER PUBLICATIONS

SlingShot CD Package, 2 sheets, c. 2000.

(Continued)

*Primary Examiner* — Jacob K Ackun
(74) *Attorney, Agent, or Firm* — Patterson Thuente Pedersen, P.A.

(57) ABSTRACT

A secure carrier assembly for media devices and media content. The assembly includes a carrier having a front panel, a rear panel, and an intermediate panel. At least one panel of the carrier comprises a durable polymeric material, such as a lens sheet assembly including a lens sheet, and an image layer. The carrier with lens sheet assembly provides enhanced security features, increased durability, and eye-catching features compared to traditional carrier or packaging assemblies.

14 Claims, 7 Drawing Sheets

(56) References Cited

U.S. PATENT DOCUMENTS

| | | | |
|---|---|---|---|
| 5,782,347 A | 7/1998 | Fantone et al. | |
| 5,791,474 A | 8/1998 | Hansen | |
| 5,833,068 A | 11/1998 | Fantone | |
| 5,850,913 A | 12/1998 | Fantone et al. | |
| 5,918,909 A | 7/1999 | Fiala et al. | |
| 5,941,382 A | 8/1999 | Fantone et al. | |
| 6,179,119 B1 | 1/2001 | Manoogian | |
| 6,224,108 B1 | 5/2001 | Klure | |
| 6,328,341 B2 | 12/2001 | Klure | |
| 6,349,829 B1 | 2/2002 | Matheis et al. | |
| 6,439,613 B2 | 8/2002 | Klure | |
| 6,454,165 B1 | 9/2002 | Dawson | |
| 6,481,994 B1 | 11/2002 | McCannel et al. | |
| 6,520,329 B1 | 2/2003 | Fuchs et al. | |
| 6,543,809 B1 | 4/2003 | Kistner et al. | |
| 6,588,591 B1 | 7/2003 | Schabert et al. | |
| 6,601,415 B2 | 8/2003 | Takinami | |
| 6,640,974 B2 | 11/2003 | Malone | |
| 6,715,795 B2 | 4/2004 | Klure | |
| 6,964,810 B2 | 11/2005 | McCannel et al. | |
| 7,117,512 B1 | 10/2006 | Cahill | |
| 7,219,829 B2 | 5/2007 | Treat | |
| 7,222,797 B2 | 5/2007 | Davila et al. | |
| 7,300,535 B2 | 11/2007 | McCannel et al. | |
| 7,537,168 B2 | 5/2009 | Anderson et al. | |
| 7,658,282 B2 | 2/2010 | Costel | |
| 7,681,732 B2 * | 3/2010 | Moehlenbrock et al. | 206/459.1 |
| 7,726,477 B1 | 6/2010 | Gaither | |
| 8,292,072 B2 * | 10/2012 | Corey et al. | 206/311 |
| 2002/0157973 A1 | 10/2002 | Preisler | |
| 2003/0004889 A1 | 1/2003 | Fiala et al. | |
| 2003/0018586 A1 * | 1/2003 | Krahn | 705/58 |
| 2003/0028439 A1 | 2/2003 | Cox et al. | |
| 2003/0080013 A1 | 5/2003 | Smith | |
| 2003/0150762 A1 | 8/2003 | Biller | |
| 2003/0234191 A1 | 12/2003 | Belden et al. | |
| 2004/0008613 A1 | 1/2004 | Beckwith et al. | |
| 2004/0151880 A1 | 8/2004 | Nakamura et al. | |
| 2005/0045503 A1 | 3/2005 | Wong et al. | |
| 2005/0199516 A1 | 9/2005 | Laarman | |
| 2005/0205442 A1 | 9/2005 | Spagna | |
| 2005/0279143 A1 | 12/2005 | Belden et al. | |
| 2005/0279825 A1 | 12/2005 | Ashby et al. | |
| 2006/0207896 A1 | 9/2006 | Shiga | |
| 2006/0256413 A1 | 11/2006 | Kitamura | |
| 2007/0144044 A1 | 6/2007 | Kershner et al. | |
| 2008/0030864 A1 | 2/2008 | Gougeon et al. | |
| 2008/0088126 A1 | 4/2008 | Hoffman et al. | |
| 2008/0088931 A1 | 4/2008 | Hoffman | |
| 2008/0116089 A1 | 5/2008 | Roberts | |
| 2008/0150174 A1 | 6/2008 | Raymond et al. | |
| 2008/0213528 A1 | 9/2008 | Hoffman | |
| 2009/0078590 A1 | 3/2009 | Smith | |
| 2009/0107862 A1 | 4/2009 | Pascua et al. | |
| 2009/0277808 A1 | 11/2009 | Payne | |
| 2010/0193583 A1 | 8/2010 | Tartavull et al. | |
| 2010/0213092 A1 | 8/2010 | Swain | |
| 2011/0031148 A1 * | 2/2011 | Rosendall et al. | 206/459.1 |
| 2011/0132783 A1 | 6/2011 | Williams et al. | |
| 2012/0145578 A1 * | 6/2012 | Pazlar et al. | 206/459.5 |

OTHER PUBLICATIONS

Introducing RiverBorne™ Communications, 17 pages, c. 2000.

Application and File history for U.S. Appl. No. 12/962,344, filed Dec. 7, 2010. Inventors: David L. Williams et al.

Application and File history for U.S. Appl. No. 12/962,372, filed Dec. 7, 2010. Inventors: David E. Corey et al.

Print-out from "UltraViolet™—Your Movies in the Cloud", available at http://www.sonypictures.com/homevideo/ultraviolet/about.html, at least as early as 2014, 2 pages.

* cited by examiner

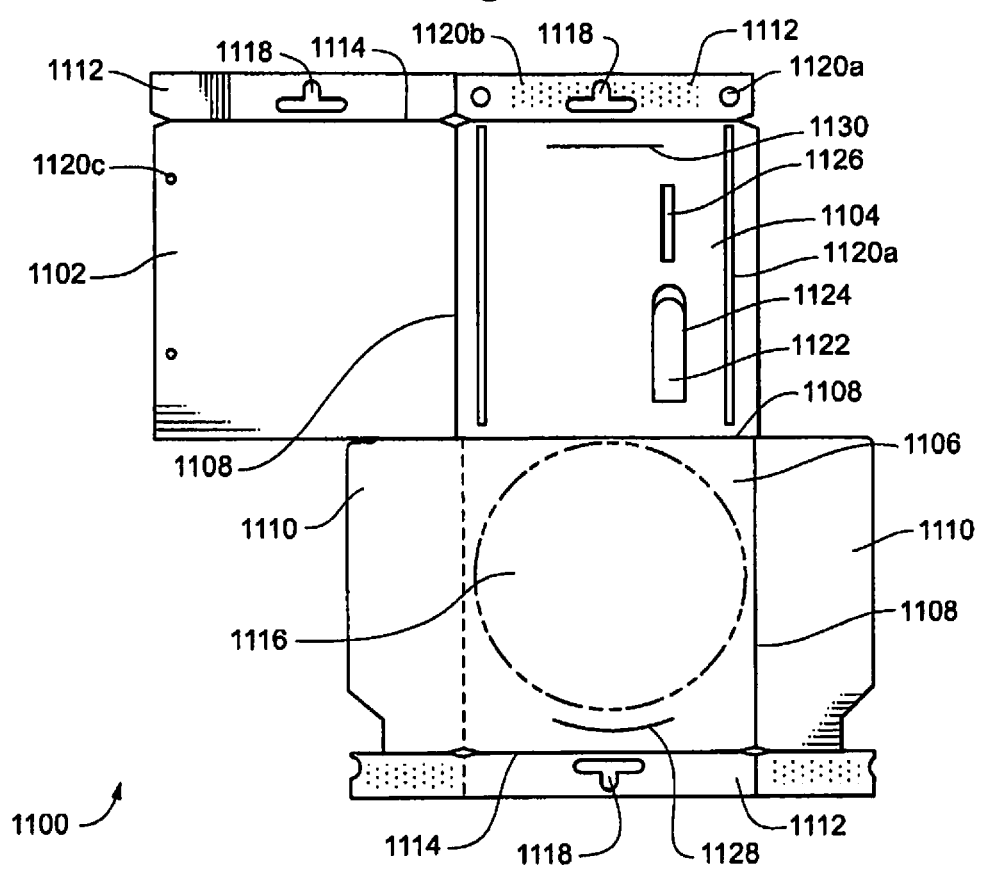

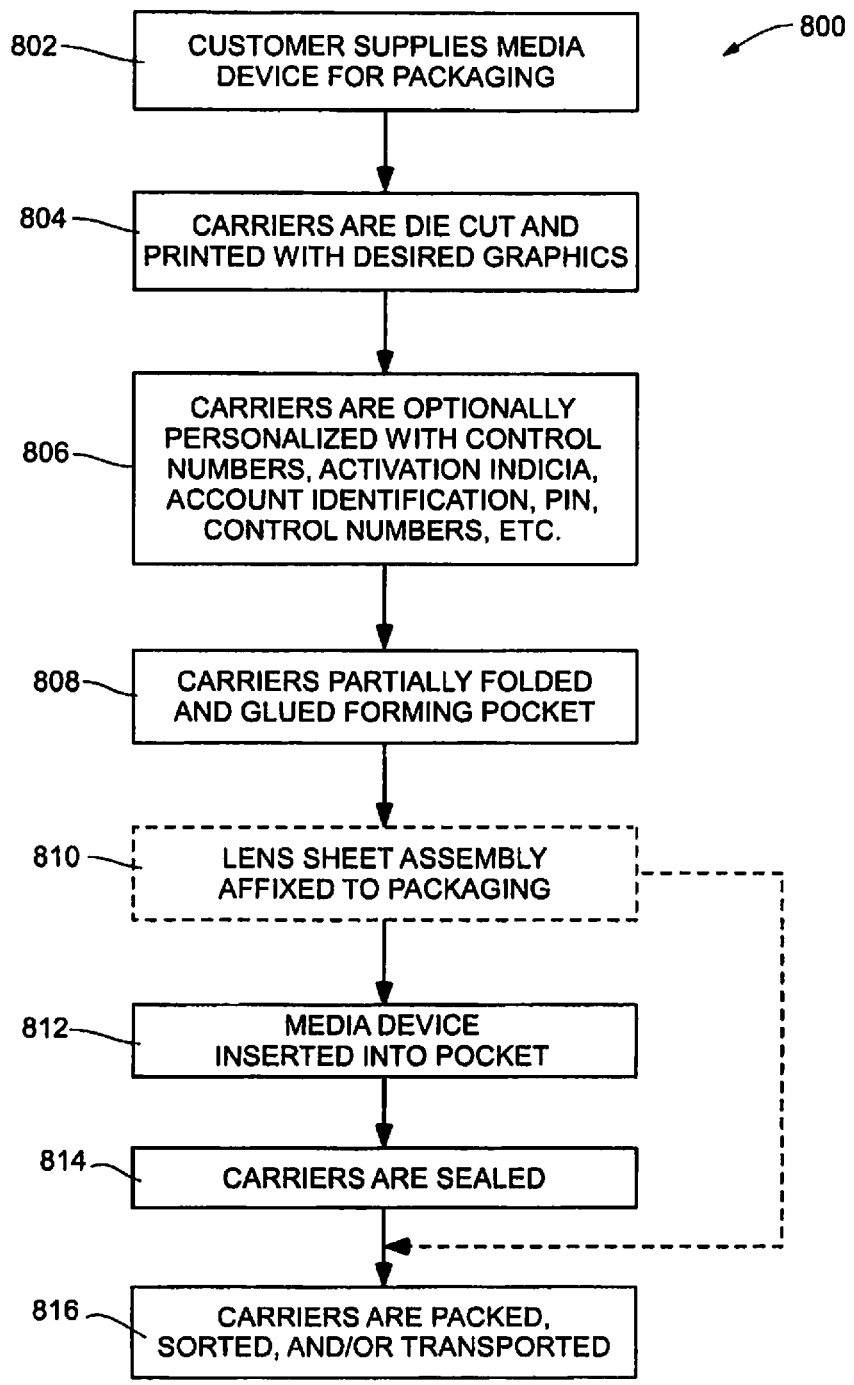

DURABLE PACKAGING ASSEMBLY FOR MEDIA DEVICES

RELATED APPLICATION

This application is a continuation of application Ser. No. 12/962,372 filed Dec. 7, 2010, which claims the benefit of U.S. Provisional Application No. 61/267,340, filed Dec. 7, 2009 and to 61/306,859, filed Feb. 22, 2010, each of which is hereby fully incorporated herein by reference.

FIELD OF THE INVENTION

The invention relates generally to packaging for a variety of articles such as stored-value cards and media devices. More particularly, the invention relates to an attractive yet tamper-evident carrier assembly including a plurality of panel portions, and a transaction card and/or media device enclosed within the panel portions.

BACKGROUND OF THE INVENTION

Packaging of articles can offer a variety of features including eye-catching features to enhance attractiveness of the packaging and to attract potential buyers. However, it may also be important that the packaging offer security features so that the article(s) contained within the packaging cannot be easily removed or to reduce or prevent the perpetration of fraud. Such packaging is desired when used in combination with articles of higher value, such as media devices including DVD, BluRay discs, and CDs, or articles that are associated with a metered account, such as a transaction card.

Secure and/or eye-catching packaging is desired for use with media devices, including optical storage media, such as DVDs, CDs, laser discs, Blu-Ray discs, and the like. The most common type of packaging is jewel cases. A jewel case is a three-piece plastic case, which usually contains an optical media disc along with the liner or album notes and a back card. Two opposing transparent halves are hinged together to form the casing, the back half holding a media tray that grips the disc by its hole. All three parts are made of injection-molded polystyrene.

However, there are a number of issues with the format of the jewel case. The structure has a weakness in that the case is hinged on two brittle plastic arms which often break if the case receives shock or stress. Likewise, the teeth of the hub holding the disc are also prone to failure by snapping. On the other hand, there is a problem with the tabs which hold the liner notes in place; sometimes, especially with larger booklets, the tabs grip the booklet too tightly, leading to tearing. Likewise, when replacing the booklet, it can get snagged and crumple or ripped. Jewel cases can also be expensive to manufacture, and equally as expensive to mail or ship.

Another type of optical media packaging is the paper envelope or sleeve. It is the simplest, least expensive package. More expensive versions add a transparent window to the envelope allowing the disc label to be seen. The envelope can also be made out of spunbonded polyethylene (trade-named Tyvek). This is both more durable and less abrasive than paper. However, such packaging is rare for commercial releases due to its relative lack of protection compared with other designs, and is primarily limited to promotional and demo discs.

Yet another type of optical media packaging is the Q Pack. The Q Pack includes a corrugated raised area where the top hinges to the back. Because Q Pack cases are not transparent, generally cover art is applied as a decal to the cover. Decals can also be applied to the inside front, on the tray underneath the hub and the back cover. A slot for an insert booklet is found inside the front cover as on typical jewel cases.

Another type of optical media packaging is the digipak, referring to a particular type of CD or other optical media case, which essentially consists of a plastic optical disc tray glued inside a folding cardboard cover. Despite being made of paper, they were once considered a more environmentally-friendly alternative to jewel boxes. However, they remain less common than jewel cases due to higher manufacturing costs and lower resistance to wear, particularly shopwear and shipping.

A keep case or Amaray case is the most common type of DVD packaging. It is taller and thicker than a jewel case, and is made of much softer, less brittle plastic, i.e. polypropylene rather than polystyrene so it does not break as easily. They usually hold one or two discs, but are capable of holding up to six discs or more. Slimmer keep cases, so called "Slim-paks" or "Thinpaks" typically are used for DVD box sets consisting of the thin keep cases stored in a cardboard box. The thin cases are half as thick and can generally only hold one disc as a result, but there are newer slim cases that have central disc holding teeth on both sides. The teeth are made in such a way that when the case is closed, they fit between the gaps in between the teeth on the other side.

Existing packaging assemblies have limited real estate for displaying eye-catching features, and customers have become accustomed to the currently offered two-dimensional features providing limited or no additional incentive to buy the particular assembly. There remains a need for an optical media package that prevents or reduces occurrences of damage to the disc, provides a secure package that can contain personal account information or other such sensitive information, includes one or more new eye-catching features to entice customers and boost sales of the assembly, and can be efficiently and economically produced.

SUMMARY OF THE INVENTION

Packaging assemblies for articles according to embodiments of the invention overcomes many of the issues associated with the carriers described above. A carrier of the present invention can be economically and efficiently produced, while providing enhanced security features, enhanced structural integrity, as well as offering eye-catching features.

In one embodiment of the invention, a carrier assembly for media devices, such as optical storage media, generally includes a paperboard or polyboard carrier having an intermediate panel and a rear panel sealed to one another thereby creating a pocket or a sleeve for retaining the media device, and an optional front panel hingedly connect to the rear panel to sandwich the intermediate panel and the media device within the package. At least a portion of either the front panel if present or the intermediate panel includes a polymeric flexible lens sheet assembly, such as a lenticular or fly's eye sheet with one or more images viewable therethrough. The front panel can comprise the lens sheet, the lens sheet can be applied or adhered to an exterior of the front panel, or a lens sheet can be applied to an interior of the front panel through a window in the front panel.

In another embodiment of the invention, a carrier assembly for media includes a paperboard or polyboard carrier having a first panel and a second panel sealed to one another thereby creating a sealed enclosure for containing personal access indicia, such as an alphanumeric code for accessing a digital on-demand media content, such as a movie, television show, music, music videos or performances, and the like. For example, a website and an access code are concealed within the carrier. The website is then accessed, and a user enters the code, enabling the user to access and/or download the media file onto a media-playing device, such as a computer, iPod, iPAD, television, MP3 player, smart phone, or the like. Optionally, a hard copy of the same or related media is also included within the package, such as a DVD, BluRay disc, CD, and the like. At least a portion of one of the panels can include a polymeric flexible lens sheet assembly, such as a lenticular or fly's eye sheet with one or more images viewable therethrough.

The lens sheet of the embodiments includes a plastic or polymeric lens sheet having a plurality of lenticular lenses, fly's eye lenses, or any of a variety of lenses on a first surface of the lens sheet, and one or more corresponding images on a second, flat surface of the lens sheet, viewable through the lens sheet. The image can be printed directly on the flat surface of the lens sheet, and/or on a separate substrate laminated to the flat surface of the lens sheet. The image can comprise an interlaced image, hologravure image, and/or combinations thereof.

The above summary of the invention is not intended to describe each illustrated embodiment or every implementation of the present invention. The figures and the detailed description that follow more particularly exemplify these embodiments.

BRIEF DESCRIPTION OF THE DRAWINGS

FIG. 1 is a top view of an unfolded media carrier according to an embodiment of the invention;

FIG. 8 is a flow diagram illustrating a process of preparing a storage media carrier according to an embodiment of the invention.

Figure 3:
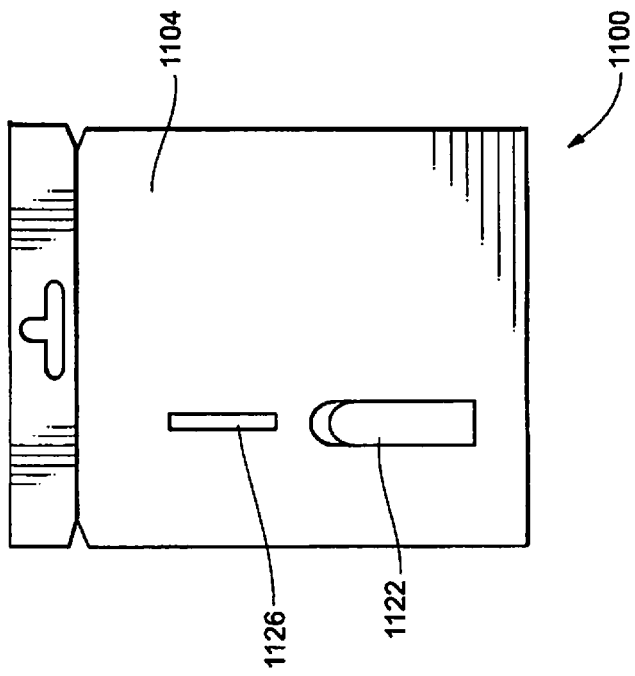
FIG. 3 is a bottom view of the carrier in FIG. 2.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

A carrier assembly according to embodiments of the invention includes a plurality of panels foldably or otherwise coupled to one another to enclose or sandwich an article, such as a transaction card, a media device, and/or personal user information within the carrier. At least one panel can comprise an eye-catching display panel to attract potential purchasers of the carrier assembly, and/or to provide enhanced security features. In one embodiment of the invention, the eye-catching display panel comprises a lens sheet assembly formed of a polymeric lens sheet such as a lenticular lens or fly's eye lens sheet, and one or more images viewable therethrough. In an alternative embodiment of the invention, the eye-catching display panel comprises printed specialty graphics including foil features, textured printing, embossing, or combinations thereof.

In one embodiment of the invention, a carrier assembly according to embodiments of the invention for packaging media devices includes a carrier having a plurality of panels foldable relative to one another to retain within and protect one or more media and/or storage devices, such as, for example, optical storage medium including DVDs, CDs, laser discs, Blu-Ray discs, memory cards, USB devices, and the like. One particular type of storage medium comprises a scan activated optical storage article, as set forth in U.S. Pat. No. 7,117,512, entitled "Scan Activated Optical Storage Article and Methods Thereof" which is incorporated herein by reference in its entirety.

In an alternative embodiment of the invention, various types of indicia, such as personal user information or access indicia for accessing a digital copy of the media is concealed within the package. For example, an access code, PIN, or other human-readable alphanumeric indicia for accessing a digital file containing the media, verifying an account, and/or providing other security features is printed on or otherwise bonded to an interior of the carrier, a separate substrate retained within the carrier, a media device if present, and/or sleeve contained with the carrier. The access indicia can further include a removable concealing layer, such as a scratch off layer or label, obscuring the indicia. Upon purchase of the carrier assembly, a user opens the carrier to access the access indicia, then registers at the web address and enters the activation code or other access indicia. Upon activation, the user can then download to their computer or other device the content of the digital file made available to the user upon activation to one or more appropriate devices for supporting the digital file, such as computers, laptops, netbooks, tablets, iPods, MP3 players, and the like.

The carrier can optionally include a security tag, such as an RFID tag either printed or applied via a label to an interior of the carrier so that it cannot be removed without tampering with the package. Alternatively, the carrier can include activation indicia on an exterior of one of the panels of the carrier, such that in order to access the content online, the carrier must be swiped, scanned, or otherwise read to activate the personal user identification tied to the content available for download. In this manner, even if a carrier was taken from the store, and breached to access the personal under information to be used online, access to the digital download and/or content on the media device would be denied because the account via the carrier was never activated.

The optical storage media and/or access information are retained and sealed within the carrier assembly until a sealed removable portion is separated from the remaining panels. Further, one or more of the panels can include an eye-catching feature, such as a lenticular lens or fly's eye lens sheet with one or more images visible therethrough, as described above.

Figure 2:
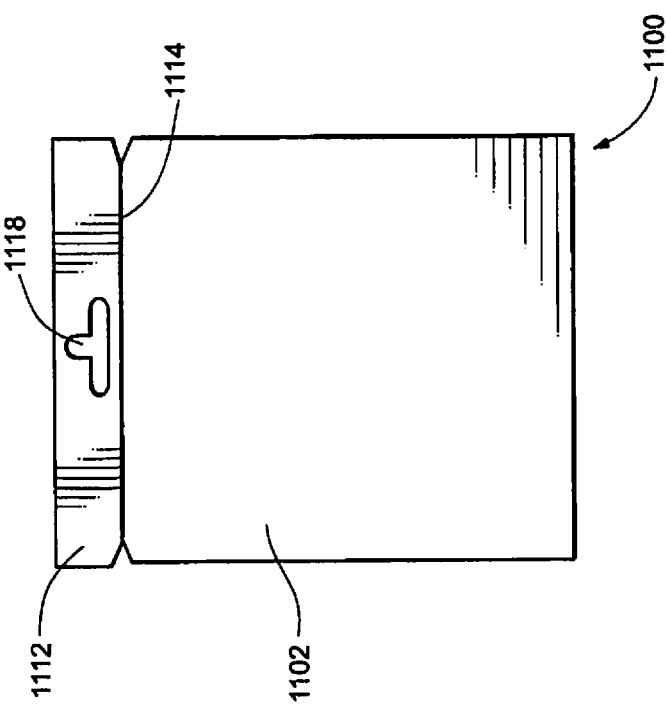
FIG. 2 is a top view of the carrier in FIG. 1 in a folded format.

Referring to an embodiment of the invention illustrated in FIGS. 1-3, a carrier 1100 includes a front panel 1102, a rear panel 1104, and an intermediate panel 1106. Carrier 1100 can comprise any suitable material such as, for example, paperboard, cardboard, polyboard, and/or the like. In some embodiments of the invention, the carrier comprises polymeric materials such that the resulting carrier assembly is flexible and durable, such that it cannot be easily torn or otherwise breached. The polymer-containing carrier can comprise, for example, polyboard, paperboard with one or more polymer coatings, laminates, or layers over at least a portion thereof, or paperboard containing a polymer material dispersed therethrough.

In one embodiment of the invention, a paperboard material with one or more polymer layers includes an extrusion coated paperboard for heat sealing applications, such as, for example, Printkote EasySeal® Plus paperboard, available from MeadWestvaco, the product specification of which is incorporated herein by reference in its entirety, and is available at: http://www.meadwestvaco.com/mwv/groups/content/documents/document/mwv013505.pdf.

Panels 1102, 1104, 1106 are foldable relative to each other, and are coupled to each other by a fold line 1108. Intermediate panel 1106 can further comprise one or more wings 1110 extending from intermediate panel 1106 and separated therefrom by a fold line 1108.

One or more panels 1102, 1104, and 1106 can further comprise removable portions 1112 extending from an edge therefrom and separated by the respective panel by a line of weakness 1114, such as a score line or a perforation. Line of weakness 1114 can be formed by any of a variety of scoring techniques such as, for example, laser scoring, knife scoring, die scoring, and combinations thereof. Removable portions 1112 can comprise apertures 1118 through carrier 1100 for hanging in a display environment. Alternatively, a hook or other hanger can be adhered to the removable portion for hanging carrier 1100 in a display environment. Removal of portions 1112 after purchase results in the remainder of the carrier containing the optical storage medium more attractive for gift-giving purposes, for example.

One or more of the panels 1102, 1104, 1106 can comprise a lens sheet assembly including a lens sheet and corresponding dimensional image, such as, for example, a lenticular or fly's eye imaged sheet, described in more detail below. The lens sheet assembly offers enhanced eye-catching features to carrier 1100, while providing a flexible, yet tear resistant, durable front panel for increased security. In particular to the embodiment shown in FIG. 1, an exterior surface of front panel 1102 comprises a lens sheet assembly such that the outer front package displays one or more eye-catching features. The lens sheet assembly can provide multiple images, 3D or depth effect, and/or animation/motion to the carrier, thereby offering additional advantages to traditional secure or non-secure carriers.

In use, one or more media devices 1116, such as optical storage medium including DVDs, CDs, laser discs, Blu-Ray discs, and/or the like, are placed on intermediate panel 1106. In one particular embodiment of the invention, wings 1110 are folded inwardly towards intermediate panel 1106 such that media device 1116 is sandwiched by at least a portion of wings 1110 and intermediate panel 1106. Intermediate panel 1106 containing optical media 1116 is then folded towards rear panel 1104 such that removable portions 1112 and apertures 1118 align. Front panel 1102 is then folded inwardly into intermediate panel 1106 such that removable portions 1112 and apertures 1118 of all panels 1102, 1104, and 1106 align, and intermediate panel 1106 with optical media 1116 thereon is sandwiched between front panel 1102 and rear panel 1104.

In one embodiment of the invention, adhesive is used to secure the panels in folded position such that carrier 1100 is tamper evident or tamper proof. As illustrated in FIG. 1, rear panel 1104 has one or more adhesive areas 1120a for securing wings 1110 and therefore intermediate panel 1106 thereto. One or more removable portions 1112 can further comprise one or more adhesive areas 1120b for securing each removable portion to each other. Further, an interior side of front panel 1102 can comprise one or more adhesive areas 1120c for securing front panel 1102 to an exterior side of intermediate panel 1106.

Adhesive areas 1120 can comprise any suitable adhesive, such as hot melt adhesive, cold permanent adhesives, heat sealable materials or polymers, or combinations thereof. For example, in one particular embodiment of the invention, adhesive areas 1120a can comprise a hot melt permanent adhesive that creates a destructive, or tamper evident bond that cannot be undone without damage to the underlying carrier. Adhesive areas 1120b can comprise a hot melt permanent adhesive or a cold permanent adhesive that creates a destructive, or tamper evident bond that cannot be undone without damage to the underlying carrier. Adhesive areas 1120c can comprise a releasable adhesive, such as a fugitive adhesive.

Carrier 1100 can also optionally include a tab 1122 defined in rear panel 1104 by a line of weakening, such as a perforated edge 1124. Perforated edge 1124 can be formed by any of a variety of scoring techniques such as, for example, laser scoring, knife scoring, die scoring, and combinations thereof. In one particular embodiment of the invention, upon opening of tab 1122, a PIN or other access indicia printed on an exterior side of wing 1110 is exposed such that a recipient of the carrier assembly can access or unlock the information stored on the enclosed optical media online for use and download to one or more alternative devices, such as computers, laptops, netbooks, tablets, iPods, MP3 players, and/or the like. The information can be the same as stored on the optical media or related content to the optical media data.

For example, a user purchases carrier 1100 containing the media device. The user ruptures tab 1122 to access the access indicia comprising a PIN, activation code, or the like. A user then visits a web address that can be printed or otherwise included in carrier 1100. A user then registers at the web address and enters the activation code. Upon activation, the user can then download to their computer or other device the content of the media device or other related content made available to the user upon activation. The format of such content corresponds to the device to which it is downloaded. Alternatively, a code, such as a barcode, can be contained within or in the carrier such that when the barcode is scanned by a device, such as a computer, smart phone, etc., the device automatically takes the user to the correct website or other location for purposes of downloading the content, such as described in U.S. Patent Application Publication No. 2007/0094070, entitled "System and Method for Electronically Managing Individual and Business Information," incorporated herein by reference in its entirety.

In one particular embodiment of the invention, the access indicia is printed on an exterior side of wing 1110. A web address is also printed on one or more of the panels and/or wings and/or otherwise included in carrier 1100. Upon purchase of carrier 1100 containing the media device, a user ruptures tab 1122 to display the activation code. In order to access the content or data stored on the media device, a user visits the web address, optionally registers, and enters the activation code. The user can then access the media device content on their computer or other device. Alternatively, the activation code or PIN can be printed anywhere on the interior of the carrier, on a separate substrate contained within the carrier, on an interior or exterior of a sleeve containing the media device, or any combination thereof. A removable scratch-off layer or label can also be applied over the activation code or PIN.

Carrier 1100 can also optionally include structure defining one or more windows 1126 for displaying non-sensitive information printed or otherwise applied to one or more panels of carrier 1100. Such information can include, for example, manufacturing control information, such as a control number or barcode that aids in correlating the enclosed optical media with the correct packaging. In one particular embodiment of the invention, window 1126 is defined within rear panel 1104. An alphanumeric control code printed on an exterior side of wing 1110 is displayed through window 1126 when carrier 1100 is in folded configuration. The control number matches the disc to the particular packaging containing corresponding art work, terms and conditions, printing, and/or the like.

Once the carrier 1100 has been opened to access its contents, damage will result to the carrier 1100 at or near where the adhesive was applied to portions 1112. If the enclosed disc is going to be given as a gift, for example, the damage will detract from the attractiveness of the packaging. As described above, portions 1112 can be torn or removed from the remainder of the carrier 1100 at lines of weakness 1114. The remainder of the carrier 1100 can then be used as an envelope to retain disc 1116. Intermediate panel 1106 can then be refolded against rear panel 1104. A tab 1128 on panel 1106 is then inserted into a slit or cut 1130 in panel 1104 in order to keep the envelope closed, or vice versa.

As discussed above, when carrier 1100 is folded, as shown in FIG. 3, a control number is displayed through window 1126, and upon peeling back of tab 1124, a PIN is exposed to the exterior. Both the control number and PIN are printed on an exterior side of wing 1110 for this particular configuration.

Figure 4:
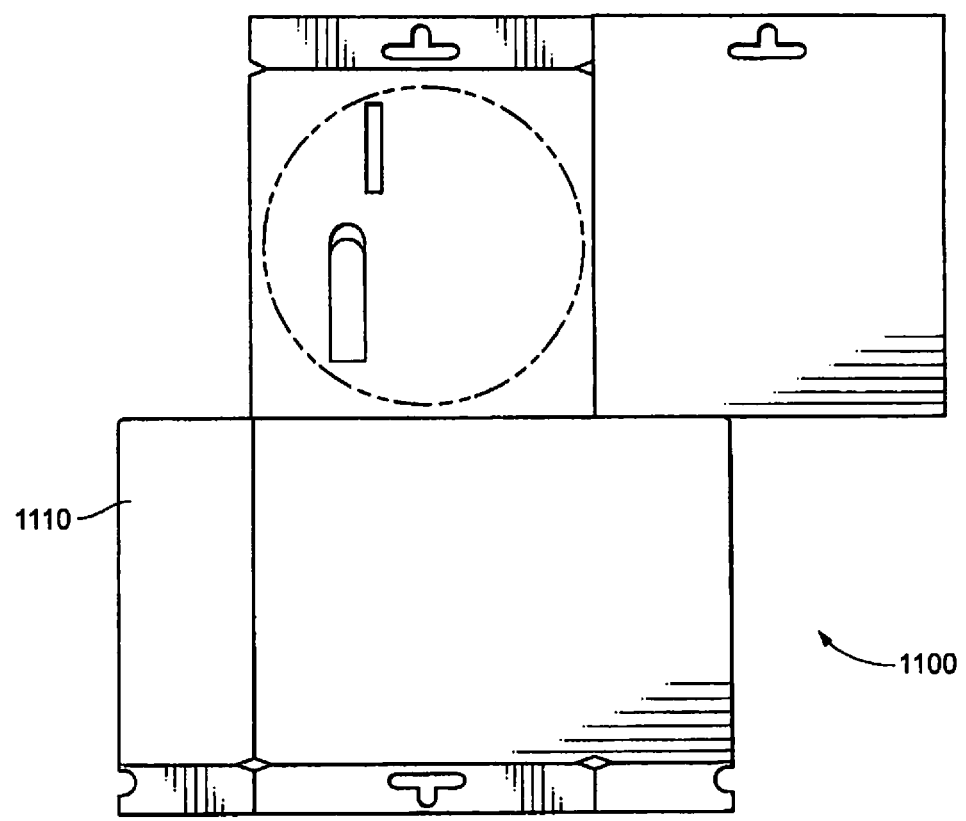
FIG. 4 is a top view of an unfolded media carrier according to another embodiment of the invention.

An alternative yet similar configuration to the embodiment of FIG. 1-3 is illustrated in FIG. 4, the difference being in the shape of wings 1110.

Figure 5:
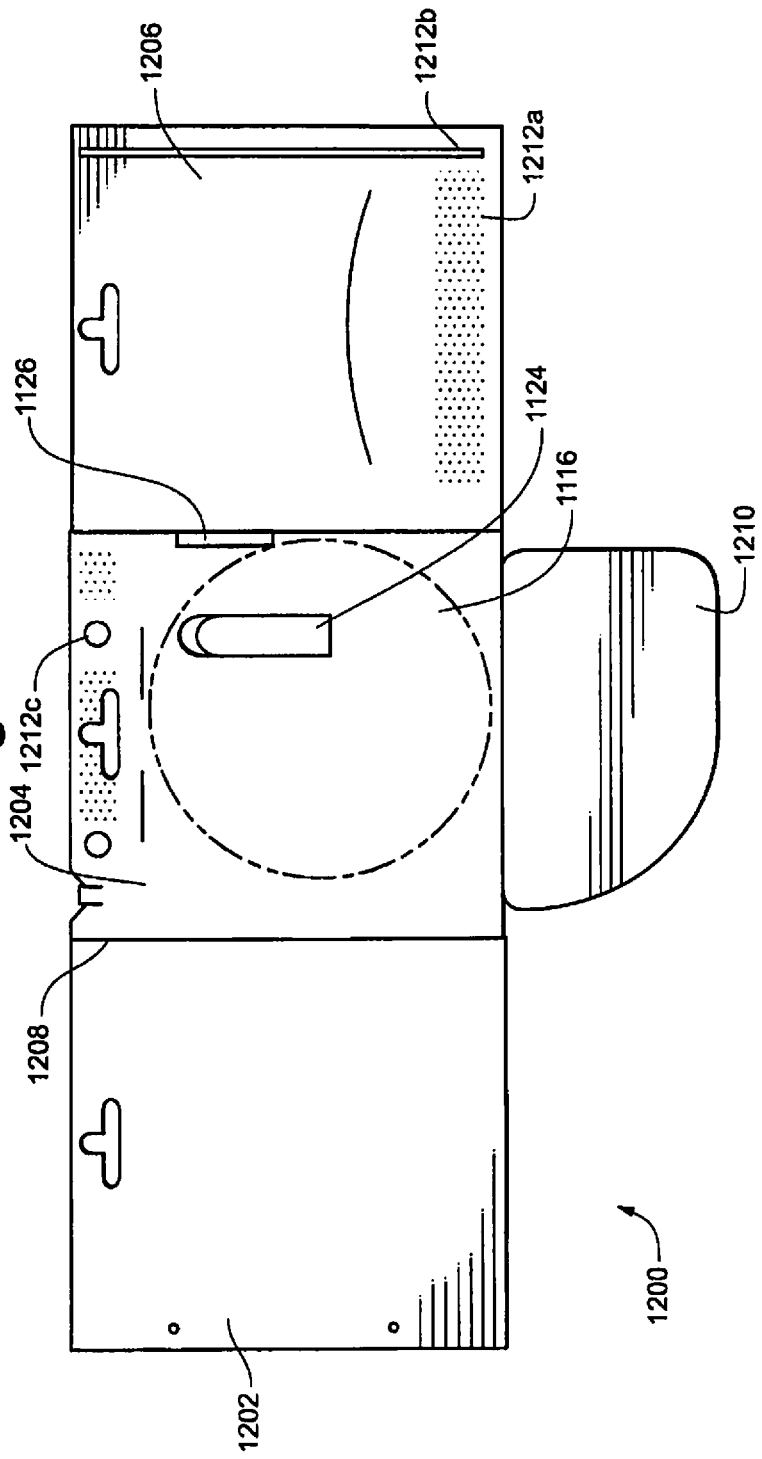
FIG. 5 is a top view of an unfolded media carrier according to another embodiment of the invention.

In another embodiment of the invention, referring to FIG. 5, carrier 1200 includes a front panel 1202, a rear panel 1204 separated by folding line 1208, and an intermediate panel 1206 separated from rear panel 1204 by folding line 1208 on an edge opposite of front panel 1202 such that rear panel 1204 is in the center of a bi-fold configuration. Wing 1210 extends from a bottom edge of rear panel 1204 and is separated by folding line 1208.

Rear panel 1204 can optionally include tab 1124 and/or window 1126 as described in the first embodiment of FIGS. 1-3. In this case, a control number to be displayed through window 1126 is printed on an interior side of intermediate panel 1206, while a PIN, or any other type of indicia that is capable of verifying an account, and/or provide other security features, is printed on an interior side of tab 1124 such that upon peeling back of tab 1124 the PIN is exposed on the opposite of tab 1124.

In use, one or more media devices 1116 are placed on rear panel 1204. Wing 1210 is folded inwardly onto rear panel 1204 such that optical media 1116 is sandwiched between wing 1210 and rear panel 1204. Intermediate panel 1206 is then folded inwardly onto wing 1210, and front panel 1202 is folded inwardly onto intermediate panel 1206 such that intermediate panel is sandwiched between rear panel 1204 and front panel 1202.

Similarly to the embodiment of FIG. 1, adhesive areas 1212a, 1212b, and 1212c are incorporated to seal carrier 1200 into folded configuration such that carrier 1200 is tamper proof or tamper evident.

One or more of the panels 1202, 1204, 1206 can comprise a lens sheet assembly including a lens sheet and one or more corresponding images viewable therethrough, such as, for example, a lenticular or fly's eye imaged sheet. In one particular embodiment, an exterior surface of front panel 1202 comprises a lens sheet assembly such that the outer front package displays one or more eye-catching features and provides a durable, yet flexible cover.

Figure 6:
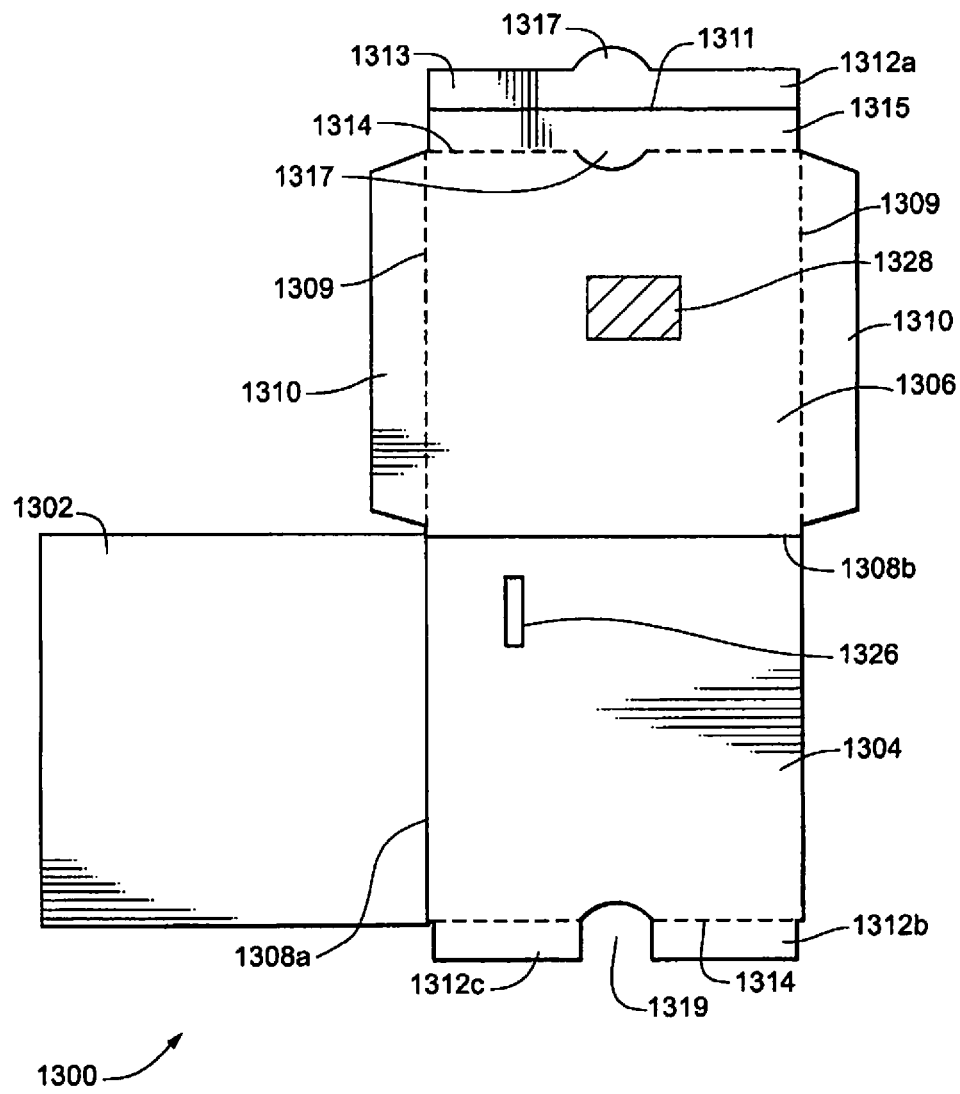
FIG. 6 is a top view of an unfolded media carrier according to another embodiment of the invention.

In yet another embodiment of the invention, and referring to FIG. 6, a carrier 1300 includes a front panel 1302, a rear panel 1304, and an intermediate panel 1306. Carrier 1300 can comprise any suitable material such as, for example, paperboard, cardboard, polyboard, and the like. Front panel 1302 and rear panel 1304 are foldably coupled along a first common edge or fold line 1308a. Intermediate panel 1306 and rear panel 1304 are coupled along a second common edge or fold line 1308b adjacent to first fold line 1308a. Intermediate panel 1306 can further comprise one or more wings 1310 extending from intermediate panel 1306 and separated therefrom by fold lines 1309.

One or more panels 1302, 1304, and 1306 can further comprise removable portions 1312 extending from an edge therefrom and separated by the respective panel by a line of weakness 1314, such as a score line or a perforation. Line of weakness 1314 can be formed by any of a variety of scoring techniques such as, for example, laser scoring, knife scoring, die scoring, and combinations thereof. Removable portions 1312 can comprise apertures (not shown) through carrier 1300 for hanging in a display environment. Alternatively, a hook or other hanger can be adhered to the removable portion for hanging carrier 1300 in a display environment.

In one particular embodiment, as shown in FIG. 6, removable portion 1312a comprises a first top portion 1313 and middle portion 1315 separated by fold line 1311. Removable portion 1312a is coupled to intermediate panel 1306 via a line of weakness 1314 separating intermediate panel 1306 and middle portion 1315. First portion 1313 and second portion 1315 each comprise a corresponding tab portion 1317 extending from an edge therefrom. First portion 1313 is foldable over onto second portion 1315 such that tab portions 1317 align.

An edge of rear panel 1304 comprises structure defining a knock-out portion 1319 between removable portions 1312b and 1312c. Knock-out portion 1319 corresponds in shape to tab portions 1313 and 1315. Removal of portions 1312a after purchase results in a corresponding knock-out portion in intermediate panel 1306 such that an interior of carrier 1300 is easily accessible.

One or more of the panels 1302, 1304, 1306 can comprise a lens sheet assembly including a lens sheet and corresponding dimensional image, such as, for example, a lenticular or fly's eye imaged sheet as described above. The lens sheet assembly offers enhanced eye-catching features to carrier 1300, while providing a flexible, yet tear resistant, durable front panel for increased security.

In particular, an exterior surface of front panel 1302 comprises a lens sheet assembly such that the outer front package displays one or more eye-catching features. The lens sheet assembly can provide multiple images, 3D or depth effect, and/or animation/motion to the carrier, thereby offering additional advantages to traditional secure or non-secure carriers.

In use, wings 1310 are folded inwardly towards intermediate panel 1306 and optionally secured, such as by adhesive, to intermediate panel 1306. Intermediate panel 1306 is then folded towards rear panel 1304 such that removable portions 1312a, 1312b, and 1312c align, and knock-out portion 1319 and tabs 1317 align. Adhesive is used to secure intermediate panel 1306 and rear panel 1304 in a folded position such that a pocket is formed between the two panels. For example, rear panel 1304 can have one or more adhesive areas for securing wings 1310 and therefore intermediate panel 1306 thereto. Alternatively, adhesive can be applied wings 1310, or to both wings 1310 and rear panel 1304.

One or more sleeves containing one or more media devices is then inserted into the pocket formed by securing intermediate panel 1306 to rear panel 1304. Once the desired media device(s) are inserted into the pocket, one or more removable portions 1312 can further comprise one or more adhesive areas (not shown) for securing each removable portion to each other, and thereby completely securing or enclosing the media devices within carrier 1300.

Front panel 1302 is then folded onto the pocket formed by rear panel 1304 and intermediate panel 1306 such that the intermediate panel 1306 and the media device are sandwiched between front panel 1302 and front panel 1304. Front panel 1302 can be either secured to intermediate panel 1306 or can be hingedly coupled such that it is free to shift without damaging the carrier from a first position, in which intermediate panel 1306 is covered, to a second position, in which intermediate panel 1306 is exposed.

The adhesive used in sealing any of the panels together in any of the embodiments above can comprise any suitable adhesive. For example, in one particular embodiment of the invention, the adhesive can comprise a hot melt permanent adhesive that creates a destructive, or tamper evident bond that cannot be undone without damage to the underlying carrier. The adhesive areas can comprise a hot melt permanent adhesive or a cold permanent adhesive that creates a destructive, or tamper evident bond that cannot be undone without damage to the underlying carrier.

In one particular embodiment of the invention, a PIN, or other personal access indicia, is optionally printed on the sleeve containing the media device such that a recipient of the carrier assembly can access or unlock the information stored on the enclosed optical media online for use and download to alternative devices, such as computers, laptops, netbooks, tablets, iPods, MP3 players, and the like. The information can be the same as stored on the optical media or related content to the optical media data. The PIN is not accessible or viewable from the exterior until carrier 1300 is opened. Therefore, if carrier 1300 has been tampered with, such as to gain unlawful access to the PIN and/or media device, such breach of carrier 1300 will be evident. As discussed above, the personal access indicia can be incorporated anywhere with the carrier, such as printed on an interior of the carrier, on a separate substrate contained within, on the sleeve, on the media device itself, or any combination thereof.

In one example, a user purchases carrier 1300 containing the media device. The user ruptures carrier 1300 to access the PIN or other activation code. A user then visits a web address that can be printed or otherwise included in carrier 1300. A user then registers at the web address and enters the activation code. Upon activation, the user can then download to their computer or other device the content of the media device or other related content made available to the user upon activation. The format of such content corresponds to the device to which it is downloaded.

A web address can also printed on one or more of the panels and/or wings and/or sleeve or otherwise included in carrier 1300. Upon purchase of carrier 1300 containing the media device, a user ruptures carrier 1300 to gain access of the activation code and web address contained within carrier 1300. In order to access the content or data stored on the media device, a user visits the web address, optionally registers, and enters the activation code. The user can then access the media device content on their computer or other device.

Carrier 1300 can also optionally include structure defining one or more windows 1326 for displaying non-sensitive information printed or otherwise applied to one or more panels of carrier 1300. Such information can include, for example, manufacturing control information, such as a control number or barcode or other alphanumeric code that aids in correlating the enclosed optical media with the correct packaging. In one particular embodiment of the invention, window 1326 is defined within rear panel 1304. An alphanumeric control code printed on the sleeve containing the media device is displayed through window 1326 when carrier 1300 is in folded configuration. The control code matches or is similar to a control code printed on the carrier to correlate the media device to the particular packaging containing corresponding art work, terms and conditions, printing, and the like.

An optional security tag 1328 can be applied as a label, printed, or otherwise secured to one or more panels of carrier 1300. Security tag 1328 comprises an RFID, or other similar security device, such that an alarm or other indication would be activated upon unauthorized removal of carrier 1300 from a store or other retail environment.

Once the carrier 1300 has been opened to access its contents, damage will result to the carrier 1300 at or near where the adhesive was applied to portions of carrier 1300, indicating potential unlawful tampering of carrier 1300.

In an alternative embodiment of the invention not shown, when a less secure packaging option is needed, a front panel having a lens sheet assembly is coupled to a rear panel that can optionally have a lens sheet assembly. The front and rear panels are coupled via wings extending from one or both panels, such that a sleeve with sides is formed. A traditional media device package, such as a jewel case or Amaray case is then inserted into the sleeve. The sleeve can optionally comprise structure defining a window such that a control number printed on the media device package is viewable through the sleeve to ensure the sleeve is matched correctly to the media device. The sleeve acts as additional packaging offering eye-catching features.

Figure 7:
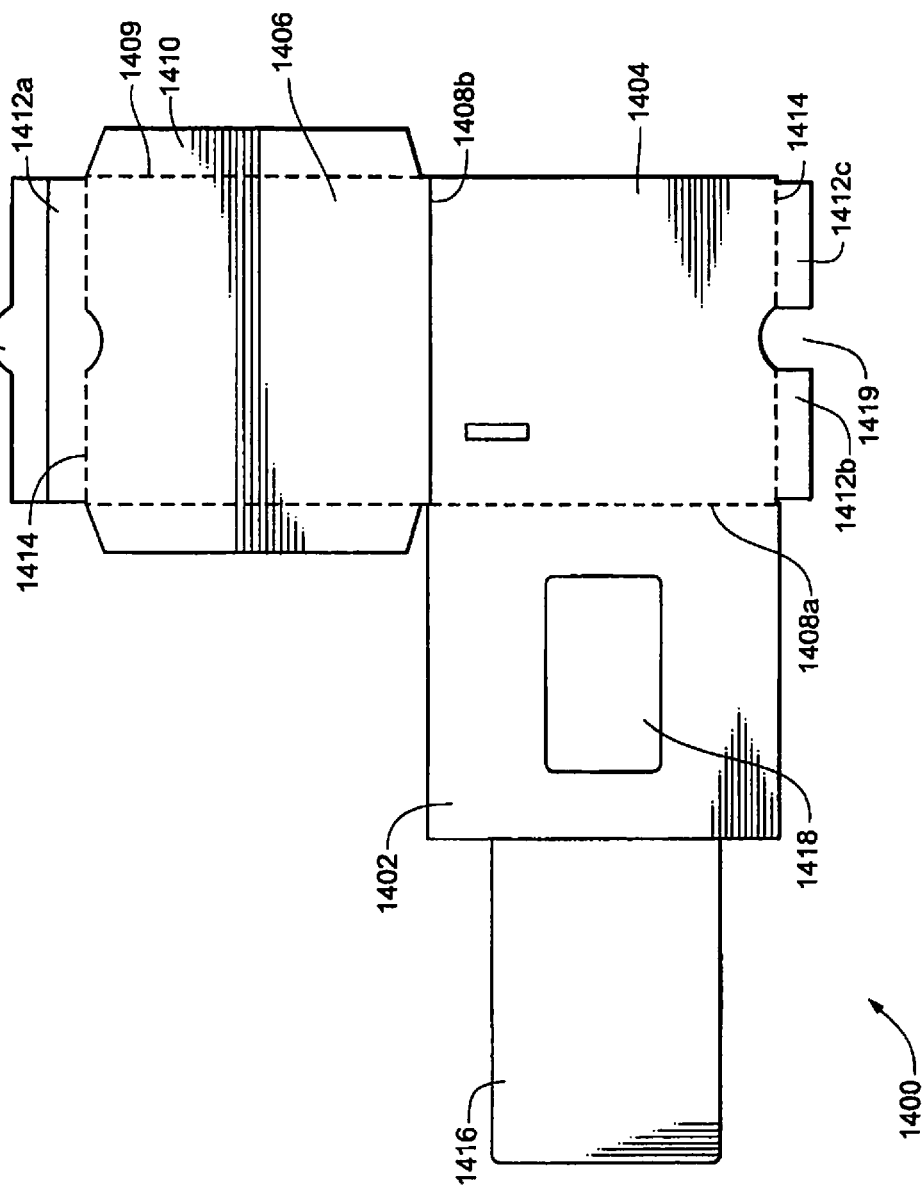
FIG. 7 is a top view of an unfolded media and transaction card carrier according to an embodiment of the invention.

Referring to FIG. 7, a carrier 1400 can generally comprises a similar configuration to the embodiment illustrated in FIG. 12, including front panel 1402, a rear panel 1404, and a first intermediate panel 1406. Front panel 1402 and rear panel 1404 are foldable coupled along a first common edge or fold line 1408*a*. First intermediate panel 1406 and rear panel 1404 are coupled along a second common edge or fold line 1408*b* adjacent to first fold line 1408*a*. First intermediate panel 1406 can further comprise one or more wings 1410 extending from first intermediate panel 1406 and separated therefrom by fold lines 1409.

One or more panels 1402, 1404, and 1406 can further comprise removable portions 1412 as described above separated by the respective panel by a line of weakness 1414, such as a score line or a perforation.

Carrier 1400 further comprises a second intermediate panel 1416 coupled to front panel 1402 along a third edge or fold line 1408*c* opposite first edge 1408*a*. Second intermediate panel 1416 is adapted to receive and retain a card or other element thereon. Such cards can comprise, for example, a transaction card, a prepaid card, a gift card, an identification card, a loyalty card, a phone card, or combinations thereof. Optionally, an adhesive, such as a releasable or fugitive adhesive, can be used to adhere a card to intermediate panel 1416.

Optionally, front panel 1402 includes structure defining a window 1418 such that at least a portion of the card is viewable to the exterior of the carrier when in a folded configuration. In one embodiment of the invention, the card includes a lens sheet assembly such that the lens sheet assembly is viewable through window 1418. In another embodiment of the invention, front panel 1402 includes a lens sheet assembly on one or more portions thereof. In yet another embodiment of the invention, the card and front panel 1402 each include a lens sheet assembly, maximizing the real estate for displaying eye-catching features. The lens sheet assembly can provide multiple images, 3D or depth effect, and/or animation/motion to the carrier, thereby offering additional advantages to traditional secure or non-secure carriers.

In use, wings 1410 are folded inwardly towards first intermediate panel 1406 and are optionally secured, such as by adhesive, to first intermediate panel 1406. First intermediate panel 1406 is then folded towards rear panel 1404 such that removable portions 1412a, 1412b, and 1412c align, and knock-out portion 1419 and tabs 1417 align. Adhesive is used to secure first intermediate panel 1406 and rear panel 1404 in a folded position such that a pocket is formed between the two panels. For example, rear panel 1404 can have one or more adhesive areas for securing wings 1410 and therefore first intermediate panel 1406 thereto. Alternatively, adhesive can be applied wings 1410, or to both wings 1410 and rear panel 1404.

One or more sleeves containing one or more media devices is then inserted into the pocket formed by securing first intermediate panel 1406 to rear panel 1404. Once the desired media device(s) are inserted into the pocket, one or more removable portions 1412 can further comprise one or more adhesive areas (not shown) for securing each removable portion to each other, and thereby completely securing or enclosing the media devices within carrier 1400.

One or more cards are adhered to second intermediate panel 1416. Second intermediate panel 1416 is then folded onto and optionally secured to front panel 1402 such that the card is viewable through window 1418 if present.

Front panel 1402 with second intermediate panel 1416 is then folded onto the pocket formed by rear panel 1404 and first intermediate panel 1406 such that first intermediate panel 1406 and the media device are sandwiched between front panel 1402 and front panel 1404. Front panel 1402 can be either secured to first intermediate panel 1406 or can be hingedly coupled such that it is free to shift without damaging the carrier from a first position, in which first intermediate panel 1406 is covered, to a second position, in which first intermediate panel 1406 is exposed.

The adhesive used in sealing any of the panels together and/or adhering the card to second intermediate panel 1416 can comprise any suitable adhesive. For example, in one particular embodiment of the invention, the adhesive can comprise a hot melt permanent adhesive that creates a destructive, or tamper evident bond that cannot be undone without damage to the underlying carrier. The adhesive areas can comprise a hot melt permanent adhesive or a cold permanent adhesive that creates a destructive, or tamper evident bond that cannot be undone without damage to the underlying carrier.

Carrier 1400 can include any combination of control codes, PINs, activations codes, account activation indicia and the like as described throughout. For example, a PIN or other activation code can be printed on an interior of the carrier on one or more of the panels such that it cannot be accessed until carrier 1400 is irreversibly opened. The activation code can unlock the information stored on the media device, allow transactions to be conduct against a metered account correlated to the card, and/or allow a user to access the information on the media device for downloading to another separate device.

Examples of combinations of cards and media devices packaged in the same carrier can include: (1) an identification card with policy information stored on the media device; (2) a gift card packaged with a video, such as a movie on the media device in which the gift card is for additional movies, food such as popcorn, theater tickets, iTunes or the like, monetary value at a particular retail or wholesale store, or general cash value such as a check card; (3) a transaction card with account information such as terms and conditions, a budgeting tool, or other information related to transaction cards; or any of a variety of other combinations.

Any of a variety of panel configurations, windows, tabs, wings, removable portions, fold lines, and the like can be contemplated when creating a carrier according to embodiments of the invention, and the configurations are not limited to the specific embodiments described herein.

In any of the above embodiments, one or more panels can comprise a lens sheet assembly. The lens sheet assembly can provide multiple images, 3D or depth effect, and/or animation/motion to the carrier, thereby offering additional advantages to traditional secure or non-secure transaction card carriers. For example, the lens sheet assembly offers eye-catching or enhanced attractiveness to the packaging because the features displayed by the lens sheet assembly draws notice to the article, and the recipient will often look at the article for an amount of time sufficient to receive at least a part of the intended message.

Additionally or alternatively, the carrier with lens sheet assembly can provide enhanced security features to traditional carriers because the image viewable through the lens further obscures the view of an article or other information or data concealed within the carrier. Further, because the lens sheet comprises a polymeric material that is difficult to tear without damage, the durability of the carrier increases from traditional paper stock or card stock so as to form tamper-proof or tamper evident package.

The lens sheet assemblies referenced in the embodiments below generally includes a lens sheet having a plurality of lenses, and one or more image layers viewable therethrough. Specifically, the lens sheet generally comprises a plastic lens sheet, such as, for example, APET, Polyethylene terephthalate glycol (PETG), polystyrene, polyvinylchloride (PVC), polyethylene, polypropylene, polylactic acid (PLA), recycled polymers such as recycled polyethylene, polystyrene, and polypropylene, blends of recycled polymers with virgin polymers, and combinations thereof. The lens sheet can have a thickness from about five to about ten mil in one example, from about ten to about twenty mil in another example, and from about twenty to about forty mil in yet another example.

The lens sheet includes a first surface having a plurality of lenses, such as lenticular or fly's eye lenses, and a generally planar second surface. The first surface of the lens sheet can be entirely covered by lenses or partially covered in one or more areas, such as described in Provisional Application Ser. No. 61/420,571 incorporated herein by reference in its entirety. In one embodiment of the invention, the first surface can comprise a graphic image layer on one or more portions of the first surface which do not contain lenses. In one embodiment, the lens sheet comprises a lenticular lens sheet having a pitch of from about 40 lenticules per inch (LPI) to about 200 LPI. The lens sheet assemblies can be of a thicker construction (e.g. ten mils or greater), such as those described in U.S. Pat. No. 6,900,944 entitled "Lenticular Card and Processes for Making", or of a thinner constructions (e.g. ten mils or less), such as those described in U.S. Application Publication No. 2010/0134895 entitled "Thin Film High Definition Dimensional Image Display Device and Methods of Making Same," both of which are incorporated herein by reference in their entireties.

One or more image layers are applied to at least a portion of the second, generally planar surface of the lens sheet. The image layer(s) can be printed directly on the second, generally planar surface of the lens sheet. Alternatively, the image layer(s) can be printed on the panel on which the lens sheet is to be applied, and an unprinted lens sheet can be secured thereto with a clear adhesive.

The image layer(s) can comprise a lineform image or interlaced image, hologravure image, or any of a variety of imaging techniques used to form a dimensional image. The image layer(s) can be applied by any of a number of printing techniques, such as, for example, lithographic, flexographic, screen printing, gravure, digital ink jet, digital drop on demand, digital thermal printing, digital laser printing, digital xerographic printing, and combinations thereof. The medium used for the image layer(s) can comprise, for example, acrylic inks, water-based inks, latex inks, toners, and the like that can be cured by air, radiation, heat, fuser roller, or combinations thereof.

The image layer(s) can comprise a standard, unidirectional interlaced image, a one-color animation technique, hologravure technique, bi-directional interlacing, or combinations thereof.

In one embodiment, one-color animation is used. A one-color animation technique includes designing a dimensional image to get a desired dimensional effect by building the animation images from only one color which overprints other colors of a color process, such as a 4-CP separation. The advantage of one-color animation is that it is not necessary to have the colors in precise ink-to-ink registration. The animation will always be viewable and give high-quality dimension effect regardless of the register of the other colors. Because of the elimination or reduction of the need for critical ink-to-ink registration accuracy, web press printing with registration tolerances less than sheet fed press tolerances becomes a viable manufacturing option without compromising image quality.

In one embodiment of the invention, the image layer(s) comprise a hologravure image. Hologravure images, known by the trade name Infinidepth®, are similar to one-color animations in that the animating effect is typically incorporated in one-color of a color process, such as a 4-CP separation. However, hologravure techniques incorporate a holographic fringe pattern that gives a depth or 3D effect to the image, either in combination to the animation produced from one-color animation, or alone. The hologravure technique is set forth in a series of currently pending patent applications including U.S. Application Publication Nos. 2008/0088126 entitled "Layered Image Display Applications and Methods," 2008/0088931 entitled "Layered Image Display Sheet," and 2008/0213528 entitled "Customized Printing with Depth Effect" all of which are incorporated herein by reference in their entireties.

In another embodiment of the invention, the image layer(s) comprise a bi-directional interlaced image. Bi-directional interlacing is an imaging process in which an interlaced image is interlaced in a first direction, e.g. side-to-side or left-to-right, and an interlaced image is interlaced in a second direction, e.g. top-to-bottom. The bi-directional interlaced image can then be printed. One-color animation can be incorporated into the bi-directional interlaced image to accommodate limitations in the printing process. Bi-directional interlacing can be used, for example, to create a 3D or animation illusion in a first direction, while creating other animation, color change, or a 3D effect in a second direction, depending on the viewing angle.

Optionally, one or more opaque ink layers (not shown) can be applied to the image layer(s) and the lens sheet. The opaque ink layer can comprise, for example, a white acrylic ink. The opaque ink layer can be applied multiple times in order to provide sufficient opacity. The optional opaque ink layer can be applied by any of a number of printing techniques, such as, for example, lithographic, flexographic, screen printing, gravure, digital ink jet, digital drop on demand, digital thermal printing, digital laser printing, digital xerographic printing, and combinations thereof. The medium used for the opaque ink layer can comprise, for example, acrylic inks, toners, and the like that can be cured by air, radiation, heat, fuser roller, or combinations thereof.

One or more optional coating layers, such as a primer layer, can be applied to the lens sheet before printing and/or to the image layer after printing. This optional coating layer can provide protection to the image layer to prevent scratching, peeling, and the like, or can act as an adhesion promoter for the image layer. The optional coating layers can comprise, for example, a UV coating such as a hard coating, primer, or any of a variety of coatings, and combinations thereof. The optional coating layers can be applied using standard coating techniques, such as, for example, roll coating, curtain coating, screen coating, spray coating, and combinations thereof, and/or any of a variety of printing techniques, such as, for example, lithographic, flexographic, screen printing, gravure, digital ink jet, digital drop on demand, digital thermal printing, digital laser printing, digital xerographic printing, and combinations thereof. The optional coating layers can be cured by air, radiation, heat, fuser roller, and combinations thereof.

Referring to FIG. 8, a flow diagram shows a general assembly process 800 of the carrier. At 802, a customer that desires to use the carrier assemblies as depicted and described herein sends the manufacturer of the assemblies the storage medium. At 804, the carriers are die cut and printed with desired artwork and/or other indicia. At 806, the carrier are further customized by the addition of control numbers, PINs, account identification and activation indicia such as bar codes, magnetic stripes, and the like. At 808, the carriers are then partially folded and glued such that the interior is accessible. At 810, the lens sheet assembly, i.e. lenticular lens sheet, is affixed to one or more panels, such as the front panel, of the partially folded carrier. This step can be performed at any point in the process, such as before or after sealing of the carrier. One or more of the discs corresponding to the control number printed on the carrier are inserted into the partially folded carrier or pocket at 812. One or more cards or other elements are optionally adhered to an auxiliary panel if present or otherwise inserted into the partially folded carrier. The carrier is then completely sealed, for example, by sealing the removable portions such that the disc cannot be removed without damage to the carrier at 814. At 816, the carriers are then packed, sorted, and/or transported to the desired location for delivery to the end customer.

The invention may be embodied in other specific forms without departing from the essential attributes thereof; therefore, the illustrated embodiments should be considered in all respects as illustrative and not restrictive.

The invention claimed is:

1. A carrier assembly for media content, the carrier assembly comprising:
   a paperboard or polyboard carrier having a first panel and a second panel sealed to one another thereby creating a sealed enclosure;
   unique access indicia for accessing a web-accessible digital copy of media content, the access indicia being positioned on an interior surface of the first panel or the second panel, such that the access indicia is concealed by the carrier, wherein the access indicia is shiftable between an inactive state in which the digital copy cannot be accessed, and an active state in which the digital copy can be accessed; and activation indicia positioned on an exterior surface of the carrier, wherein the activation indicia is scanned, swiped, keyed, or read upon purchase of the carrier to shift the access indicia tied to the media content from the inactive state to the active state, wherein the carrier is tamper-evident or tamper proof such that access to the unique access indicia cannot be attained without damage to the carrier.

2. The carrier assembly of claim 1, wherein the first panel comprises a lens sheet assembly including a polymeric lens sheet having a plurality of lenses on a first surface, and at least one image layer applied to a second, planar surface of the lens sheet, such that the at least one image layer is viewable through the lens sheet.

3. The carrier assembly of claim 2, wherein the at Least one image layer is printed directly on the second surface of the lens sheet.

4. The carrier assembly of claim 2, wherein the at least one image layer is printed on a substrate, and the substrate is bonded to the second surface of the lens sheet.

5. The carrier assembly of claim 1, further comprising:
a media device having data stored thereon, the media device being at least partially enclosed between the first panel and the second panel.

6. The carrier assembly of claim 5, wherein the web-accessible digital copy of media content comprises a copy of the data stored on the media device, information associated with the data stored on the media device, or combinations thereof.

7. The carrier assembly of claim 5, wherein the media device comprises a DVD, CD, Blu-ray, laser disc, storage device, or combinations thereof.

8. The carrier assembLy of claim 1, wherein the access indicia comprises a personal identification number, an access code, a web address, or combinations thereof.

9. The carrier assembly of claim 1, wherein one of the activation indicia is positioned on one of the first panel and the rear panel.

10. The carrier assembly of claim 1, wherein the activation indicia comprises a magnetic stripe or a barcode.

11. The carrier assembly of claim 1, wherein a removable layer is applied over the access indicia to obscure the access indicia.

12. The carrier assembly of claim 1, further comprising a stored data card, the stored data card being at least partially enclosed between the first panel and the second panel.

13. The carrier assembly of claim 11, wherein the stored data card comprises transaction card, a prepaid card, a gift card, an identification card, a loyalty card, a phone card, or combinations thereof.

14. The carrier assembly of claim 1, wherein the web-accessible digital copy of media content is accessible on and/or downloadable to or at least one media-playing device.

* * * * *